United States Patent [19]

Sonnonstine et al.

[11] 4,277,551

[45] Jul. 7, 1981

[54] ELECTROPHOTOGRAPHIC PLATE HAVING CHARGE TRANSPORT OVERLAYER

[75] Inventors: Terry J. Sonnonstine, White Bear Lake; Kenneth G. Kneipp, Maplewood, both of Minn.

[73] Assignee: Minnesota Mining and Manufacturing Company, St. Paul, Minn.

[21] Appl. No.: 67,883

[22] Filed: Aug. 20, 1979

[51] Int. Cl.³ ........................ G03G 13/14; G03G 5/04; G03B 21/00

[52] U.S. Cl. ........................................ 430/120; 430/48; 430/58; 430/59; 430/84; 430/85; 430/86; 430/95; 430/128; 355/3 DD; 355/3 CH

[58] Field of Search ........................ 430/58, 59, 85, 95, 430/84, 86, 120, 48, 128, 31; 355/3 DD, 3 CH

[56] References Cited

U.S. PATENT DOCUMENTS

| | | | |
|---|---|---|---|
| 2,901,348 | 8/1959 | Dessauer | 430/67 |
| 3,723,105 | 5/1973 | Kitajima et al. | 430/85 |
| 3,791,826 | 2/1974 | Cherry | 430/58 |
| 3,879,199 | 4/1975 | Trubisky et al. | 430/58 |
| 3,928,034 | 12/1975 | Regensburger | 430/58 |
| 4,088,484 | 5/1978 | Okazaki et al. | 430/58 |
| 4,115,116 | 9/1978 | Stolka et al. | 430/58 |
| 4,121,981 | 10/1978 | Ward et al. | 430/85 |

*Primary Examiner*—Richard L. Schilling
*Attorney, Agent, or Firm*—Cruzan Alexander; Donald M. Sell; William B. Barte

[57] ABSTRACT

An electrophotographic plate comprising a conductive substrate, a photoconductive-insulative layer overlaying the substrate and a transparent, electrically active, organic, electron transport layer overlaying the photoconductive-insulative layer in which the photoconductive layer comprises a Se—Te or Se—As mixture in the range of 90-97.5 atomic percent Se or 60-97.5 atomic percent, respectively, and wherein the thicknesses of the photoconductive layer and transport overlayer range between 40 to 100 micrometers and 1 to 5 micrometers, respectively.

14 Claims, 5 Drawing Figures

ELECTROPHOTOGRAPHIC PLATE HAVING CHARGE TRANSPORT OVERLAYER

FIELD OF THE INVENTION

This invention relates to electrophotography and in particular to xerographic plates, drums, etc. on which an electrostatic image may be produced and which includes a conductive substrate, a photoconductive layer, and a charge transport overlayer.

DESCRIPTION OF THE PRIOR ART

In the art of electrophotography, and particularly xerography, it is well known to provide a photoconductive xerographic article such as a plate or drum, by coating a conductive substrate, such as an electrically conductive aluminum drum, with a photoconductive-insulative layer to form a composite layered photosensitive article. The surface of the layered article is then uniformly electrostatically charged and exposed to a pattern of activating electromagnetic radiation, such as light. Charge is selectively dissipated in the illuminated areas of the photoconductive-insulative layer, thus leaving an electrostatic charge image in the non-illuminated areas. The electrostatic charge image can then be developed to form a visible image if desired. The developed image may be fixed or made permanent on the photoconductive-insulative surface, or may be transferred to paper or some other material, and subsequently affixed by some suitable means.

The conductive substrate utilized in such electrophotographic articles usually comprises a metal such as brass, aluminum, gold, platinum, steel or the like, and may be of any convenient thickness, rigid or flexible, and in the form of a sheet, web or cylinder. The substrate may also comprise other materials such as metallized paper and plastic sheets or glass coated with a thin conductive coating. In all cases it is usually preferred that the substrate be strong enough to permit a certain amount of handling.

Typical photoconductive-insulative materials useful in forming xerographic articles include: (1) inorganic crystalline photoconductors such as cadmium sulfide, cadmium sulfoselenide, cadmium selenide, zinc sulfide, zinc oxide, and mixtures thereof, (2) inorganic photoconductive glasses such as amorphous selenium, selenium alloys, and selenium-arsenic, and (3) organic photoconductors such as phthalocyanine pigments and polyvinyl carbazole with or without additive materials which extend its spectral sensitivity.

During operation in a typical electrophotographic copying machine, the photoconductive surface of the xerographic article is exposed to the surrounding environment, and as such, is susceptible to abrasion, chemical attack, heat, and multiple exposures to light during cycling. Such exposures produce a gradual deterioration in the electrical characteristics of the photoconductive-insulative layer, resulting in defects or marks in the resultant copies which correspond to surface defects and scratches and to localized areas of persistent conductivity on the surface which fail to retain an electrical charge and high dark discharge. In addition, in order to provide the requisite photoconductive and insulative properties, it has generally been found necessary that the photoconductive-insulative layer comprise either 100% of the layer, as in the case of vitreous selenium, or that it contain a high proportion of photoconductive particles in a binder. This requirement restricts the physical characteristics, such as flexibility and adhesion of the photoconductor, of the final article, be it a plate, drum or belt, in that the characteristics are predominantly controlled by the photoconductive material and not by the resin or matrix material which is preferably present in a minor amount.

In such conventional electrophotographic articles, upon exposure to light the photoconductive properties of the photoconductive-insulative layer result in charge transport through the bulk of the layer in the case of homogeneous constructions, or through the highly loaded photoconductive particles in the case of particle-binder constructions to thereby selectively dissipate an electrostatic charge on the surface. In order to improve the physical characteristics of the outer surface to lessen the impact of environmental effects while also allowing the transport of photogenerated charge carriers to the surface, it is also known to provide a multilayered xerographic article in which a photoconductive layer on a conductive substrate is, in turn, covered by an organic insulating layer. Such structures are, for example, depicted in U.S. Pat. Nos. 2,901,348 (Dessauer et al), 3,837,851 (Shattuck et al), 3,791,826 (Cherry et al) and 3,928,034 (Regensburger).

U.S. Pat. No. 2,901,348 (Dessauer et al) depicts a multilayered electrographic article comprising in sequence, a conductive substrate, an insulating barrier layer, a p-type photoconductive-insulator layer, preferably of vitreous selenium having a thickness in the range of 20–50 μm, and an outer, very thin, insulative charge acceptor layer. Since the outer layer is said to be preferably less than one μm thick and usually on the order of 50–500 nm, the ratio of the top coat to photoconductive layer may be in the range of 0.04 to 1. Other than a general description of various insulating waxes and resins, no particularly preferred top-coat material is suggested, either chemically or in terms of desired electrical or physical properties. Such thick selenium layers are undesirable in that excessive residual charge buildup is encountered during cyclical operations.

In contrast to the ratios of top coat to photoconductor layer apparently present in the examples depicted in Dessauer et al, the remaining patents noted above are directed to multilayered articles in which the overlaying charge transport layer is typically thicker than the photoconductive-insulative layer. Such a construction is said to be desired in order that the photoconductive layer be sufficiently thin to avoid residual charge buildup and to enable the electrographic article to be flexible. Thus, for example, in U.S. Pat. No. 3,791,826 (Cherry et al) an electrophotograpic plate is depicted which comprises a conductive substrate, a barrier layer, an inorganic charge generating layer, and an organic charge transport overlayer. In that patent, the charge generating layer is required to be at least 0.15 μm thick in order to allow the generation of sufficient charge, and that it is generally preferable to be less than about one micrometer. The organic charge transport layer is required to be between 3 and 20 micrometers thick, it being indicated that layers thinner than 3 μm will not accept sufficient voltage to be useful. Thicker layers are said to provide a high resistivity surface which can support an electronic charge on the surface, while also transporting electronic charge from the charge generating layer. The charge transport layer is there disclosed to preferably comprise at least about 20 weight % of the compound 2,4,7,-trinitro-9-fluorenone (TNF), which is further preferably combined with a polyethylene terephthalate resin binder.

U.S. Pat. No. 3,837,851 (Shattuck et al) is relevant to the present invention in that it depicts a multilayered electrophotographic article in which a charge transport layer, here based on triarylpyrazoline, is placed adjacent a charge generation layer. Particularly, in an example closest to the present invention, the article is said to consist of a charge generating layer of 68% Se, 30% Te, and 2% As, evaporated onto a barrier coated conductive substrate which is in turn coated with a 15 μm layer of a pyrazoline compound. The thickness of the charge generating layer is believed to be approximately 0.3 μm.

U.S. Pat. No. 3,928,034 (Regensburger) describes an electrophotographic article which includes a photoconductive layer in which electron-hole pairs are generated, such as amorphous selenium, and an overlapping layer of an electrically active transport material into which the appropriate charge carrier may be injected. The electrically active transport material is characterized as being substantially transparent and non-absorbing in the particular wavelength region of xerographic use. Even though the described article appears to overcome some of the problems present in earlier xerographic articles, it too has its shortcomings. To prevent undesirable residual buildup of positive charges in the photoconductive layer during recycling, and to prevent excessive dark decay, Regensburger discloses that the photoconductive layer be less than 20 μm thick, and preferably be around 1 μm. Conversely, the overlaying layer of electrically active transport material is recited to be quite thick, on the order of 10 to 20 μm, such that sufficient amounts of electrostatic charge can be accepted. A device so constructed is characterized by residual charge buildup during operation, causing excessive backgrounding, or alternatively, a slow recycling rate. In addition, even though the overlayer is substantially transparent, as thicker layers are required, absorption and scattering due to included particles and partial crystallization become significant and have a detrimental effect upon the sensitivity of the device and the quality of copies produced.

SUMMARY OF THE INVENTION

Akin to electrophotographic articles disclosed in the prior art, such as those discussed hereinabove, the present invention is also directed to an electrophotographic article comprising a conductive substrate, a photoconductive-insulative layer overlaying the substrate and a transparent electrically active organic electron transport layer overlaying the photoconductive-insulative layer. However, in contrast to such articles of the prior art, the article of the present invention comprises a relatively thick photoconductive-insulative layer and a relatively thin electron transport layer adjacent thereto, in which the photoconductive-insulative layer comprises vitreous selenium and a material selected from the group consisting of tellurium and alloys thereof in which selenium is present in an amount within the range of 90 and 97.5 atomic percent. Specifically, the photoconductive-insulative layer of the article of the present invention has a thickness within the range between 40 and 100 micrometers, while the electron transport layer has a thickness within the range between 1–5 micrometers, such that the ratio of the thickness of the transport layer to that of the photoconductive-insulative layer is between 1:8 and 1:100.

In contrast to the articles depicted in the prior art or those suggested thereby, it has now been found that selenium-tellurium compositions in the range of 90:10 to 97.5:2.5 (preferably 95:5) allow the use of an exceedingly thick photoconductive-insulative layer (40–100 μm) overcoated with a very thin (1–5 μm thick) layer of an electron charge transport material. In a particularly preferred embodiment, the layer of transport material comprises 2,4,7-trinitro-9-fluorenone (TNF) dissolved in an organic binder such as a thermoplastic polycarbonate condensation product of bisphenol-A and phosgene. Such a construction has been found to exhibit very large charge acceptance and to retain low residual charge in light struck areas even after repeated cycling. Thus, there is virtually no background in the developed images and excellent copies are therefore produced. The overcoated charge transport layer is also easily cleaned, reduces the rate of drum aging, and protects against scratching from toner abrasion and paper jams.

DESCRIPTION OF THE PREFERRED EMBODIMENTS

Figure 1:
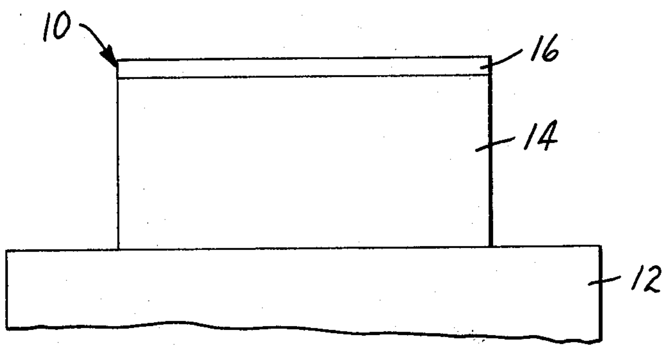
FIG. 1 is a cross section of an exemplary electrophotographic device pursuant to the present invention.

An exemplary embodiment of the present invention is shown in FIG. 1 where in cross section it may be seen that the electrophotographic device 10 includes a conductive substrate 12 onto which is coated a photoconductive-insulative layer 14 and in turn on top of which is placed an overcoat of an electron transport layer. The thickness of the photoconductive-insulative layer 14 is maintained in the range of 40 to 100 micrometers, while that of the electron transport layer is maintained to have a thickness in the range between 1 and 5 micrometers.

The substrate 12, in addition to being electrically conductive, is desirably also capable of lending physical support to the overall structure. It may be comprised of a metallic sheet such as an aluminum drum blank or the like, or be a composite metal coating on a sufficiently rigid dielectric substrate. The metal may similarly be selected from materials such as brass, aluminum, steel or the like. Further, while the overall configuration of the structure is typically provided in a drum form so as to be utilizable in a copy machine in which the drum rotates about a graphic original, the plates may similarly be used in a flat format or otherwise as desired.

The photoconductive-insulative layer 14, as mentioned above, is provided in a thickness ranging between 40 and 100 microns and is produced by vacuum evaporation of alloys of selenium together with tellurium. In the event a selenium/tellurium alloy is desired, the ratio of selenium is selected to be within the range of 90 and 97.5 atomic percent, and preferably should be 95% Se and 5% Te. Contrary to prior art teachings such as discussed hereinabove, it has been found that compositions within the range of 90 to 97.5 atomic percent selenium allow the use of thick photoconductive insulative films in the range of 40 to 100 micrometers, in combination with a very thin overcoat electron transport layer 16. Particularly, if the charge transport layer 16 is selected to be 2,4,7-trinitro-9-fluorenone (TNF) dissolved in polycarbonate binder such as General Electric Lexan ® brand Type 145, the thickness of the overcoat need only be in the range of 1 to 5 micrometers and preferably about 2 micrometers when used together with a photoconductive-insulative layer of about 65 micrometers.

The electron transport layer 16 is preferably prepared by dip coating a suitably prepared photoconductive-insulative coated drum in a solution containing solids such that about 70 weight percent of the solids is a binder such as General Electric Lexan ® brand polycarbonate Type 145 and 30 weight percent of the solids is TNF. End to end uniformity of such a dip coated layer is achieved by employing low viscosity solutions for dipping where the rate of flow of the solution across the face of the drum is greater than the rate of drying. It has generally been found that the transport layer 16 desirably comprises aromatic or heterocyclic electron acceptor materials which have been found to exhibit negative charge carrier transport properties, as well as requisite transparency characteristics. Typical electron acceptor materials within the purview of the instant invention include phthalic anhydride, tetrachlorophthalic anhydride, benzil, mellitic anhydride, S-tricyanobenzene, picryl chloride, 2,4-dinitrochlorobenzene, 2,4-dinitrobromobenzene, 4-nitrobiphenyl, 4,4-dinitrobiphenyl, 2,4,6-trinitroanisole, trichlorotrinitrobenzene, trinitro-o-toluene, 4,6-dichloro-1, 3-dinitrobenzene, 4,6-dibromo-1,3-dinitrobenzene, p-dinitrobenzene, chloranil, bromanil, and mixtures thereof. It is further intended to include within the scope of those materials suitable for the active transport layer, other reasonable structural or chemical modifications of the above described materials provided that the modified compound exhibits the desired charge carrier transport characteristics.

While any and all aromatic or heterocyclic electron acceptors having the requisite transparency characteristic are within the purview of the instant invention, particularly good electron transport properties are found with aromatic or heterocyclic compounds having more than one substituent of the strong electron withdrawing components such as nitro-(—$NO_2$), sulfonate ion (—$SO_3$), carboxyl- (—COOH) and cyano-(CN) groupings. From this class of materials, 2,4,7-trinitro-9-fluorenone (TNF), 2,4,5,7-tetranitrofluorenone, trinitroanthracene, dinitroacridine, tetracyanopyrene, and dinitroanthraquinone are preferred materials because of their availablity and superior electron transport properties.

Similarly, while a polycarbonate binder such as General Electric Lexan is primarily desired, other binder materials such as polystyrene, silicone resins such as DC-801, DC-804, and DC-996 manufactured by Dow Corning Corporation, acrylic and methacrylic ester polymers such as Acryloid A-10 and Acryloid B-72, polymerized ester derivatives of acrylic and alpha-acrylic acids such as supplied by Rohm & Haas Company, and polymerized butyl methacrylates such as Lucite 44, Lucite 45 and Lucite 46 supplied by E. I. duPont DeNemours & Company, as well as fluorinated rubbers, vinyl polymers and copolymers, cellulose esters, etc., may similarly be utilized.

Figure 2:
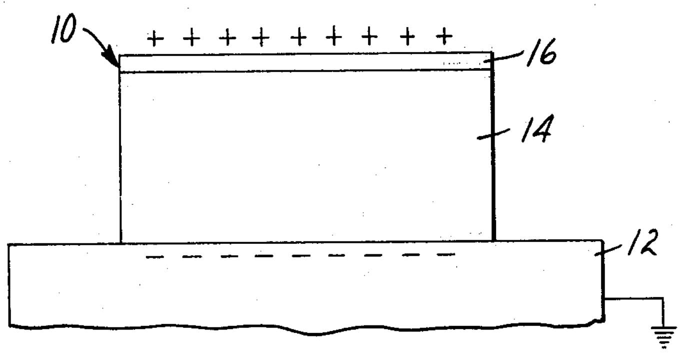
FIGS. 2 and 3 are cross sections of a device similar to that shown in FIG. 1 showing the manner in which charges are generated and dissipated during the use of such a device.

To sensitize the electrophotograpic device shown in FIG. 1 to imaging radiation, the structure is connected as shown in FIG. 2 with the conductive substrate connected to ground and the top layer 16 charged in the dark with a positive corona. The resultant positive charge layer has associated therewith a proportionate negative charge on the grounded substrate 12. Optimum behavior of such a sensitized device is found to result if the photoconductive-insulative layer 14 is sufficiently resistive under dark conditions so as not to dissipate the applied electrical charge prior to completion of the imaging procedure. Other conditions desirable for optimum behavior include a relationship between the photoconductive-insulative layer 14 and the overcoat layer 16, such that the combination can accept a high electrical field without electrical breakdown or charge conduction, and further that the photoconductive insulative laye 14 be an efficient injector of electrons into the top coat 16 and of holes into the conductive substrate 12.

Figure 3:
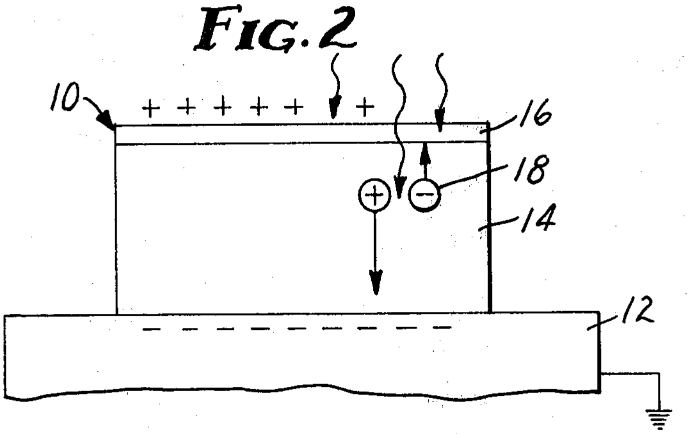

As further shown in FIG. 3, such a sensitized device may then be imaged by directing light onto the transport layer 16. The light passes through the layer 16 and is absorbed by the photoconductive-insulative layer 14, creating electron hole pairs 18. The electrons and holes are separated under the electric field resulting from the retained charges. The electrons are injected into and transported through the electron transport layer 16 while the holes are transported through the photoconductive-insulator 14, thereby imagewise discharging the surface charges where light strike, in proportion to the integrated amount of light being absorbed. In regions where radiation does not impinge upon the device, the charge distribution remains substantially the same as prior to the imaging. The imaging step is now complete, an electrostatic charge image having been formed on the surface. The image may then be developed with toners in a conventional manner to form a toner image on the surface of the drum.

Because of the novel construction of the electrophotographic device of the present invention, a very low residual charge remains in areas where light impinges upon it, thereby resulting in virtually no background in the toner image. This behavior is evidenced in excellent copy quality were the copies are made by transferring the toner image to plain paper, particularly when repeated charging and imaging operations are experienced. Added permanence is introduced in the transferred toner image when the heat fusion or pressure fusion steps are added. The topcoat surface is subsequently easily discharged and cleaned by conventional techniques.

Figure 4:
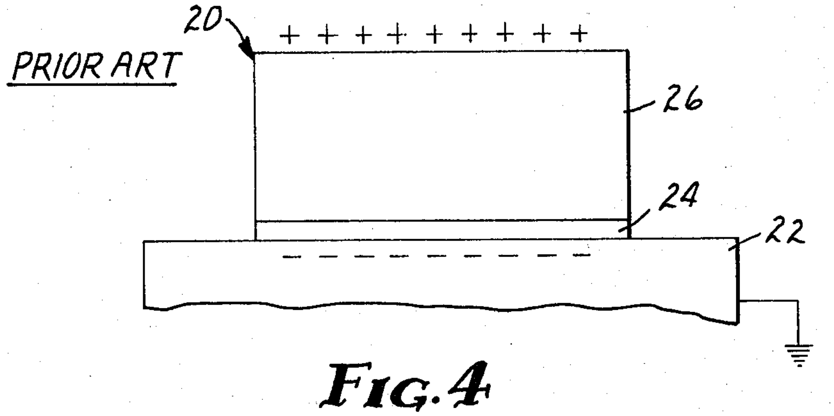
FIG. 4 is a cross section of an exemplary prior art device.

To illustrate the contrast between the present invention and that of a prior art device wherein a similar selenium drum would be provided, and using the relative thicknesses of the drum and topcoat as taught in the prior art, such a device would have a configuration as shown in FIG. 4. In such a case, the device 20 would include a conductive substrate 22 on which a photoconductive-insulative layer 24, nominally having a thickness of about 1 or 2 microns or less and in all cases less than about 20 microns, would have overcoated thereon a thick electron transport layer 26. As was mentioned hereinabove, thin photoconductive insulative layers such as the layer 24, were previously required to avoid producing undesirable positive residual charge build-up in the photoconductive insulative layer. Because of such a requirement, the overlying electron transport layer 26 was necessarily thick, such as in the 10 to 20 micrometer range, in order to attain a desirable amount of charge acceptance across the device. The thick topcoat then itself causes a large and undesirable residual charge build-up. Alternatively, if such a thick topcoat was sufficiently heavily loaded with an electron charge transporting component such as TNF, the component tended to crystallize out, thus producing a rough surface which provides traps for toner powder. Such traps prevent ready cleaning of the surface following each exposure and result in black spots on the subsequent copies.

EXAMPLE 1

A specific embodiment of the device dimensioned as shown in FIG. 1 was prepared as follows: An aluminum drum was provided with a chemically clean surface, onto which was vacuum evaporated a layer of selenium tellurium alloy having a ratio of 95:5 atomic percent selenium to tellurium. A layer approximately 60 micrometers was thus provided. The selenium tellurium coating was then in turn dip coated in a solution of 2,4,7-trinitro-9-fluoroenone (TNF) and Lexan® to produce a layer approximately 2 micrometers thick when dry. The solution used for producing the TNF/LEXAN® overcoat was prepared as follows:

| Ingredients | Wt. in Grams | % Wt. of Total |
|---|---|---|
| Dichloromethane | 480 | 47.2 |
| 1,2-Dichloroethane | 480 | 47.2 |
| GE Lexan® Type 145 | 40 | 3.9 |
| 2,4-7-trinitro-9-fluorenone (TNF) | 17.15 | 1.7 |

Upon drying, the dichloromethane and dichloroethane evaporate, leaving a layer consisting of approximately 70 wt.% Lexan® 145 and 30 wt.% TNF.

The topcoat is preferably provided by mounting the selenium-tellurium coated drum on a vertical rod and using a motor drive to control the rate of vertical motion, slowly withdrawing the drum from the coating solution at a rate of approximately 1 centimeter per second. While the rate at which the solution thus flows across the surface of the drum continually varies during withdrawal due to the displacement of the solution by the drum, this variability in the rate of flow does not appear to cause any non-uniformity in the coating thickness. In order to provide a control so as to enable determination of the relative effectiveness of the overcoating, only the lower half of the drum was inserted into the coating solution thus providing a coating on one half of the drum, with the other half being left uncoated. The thus produced electrophotographic drum was then placed in a 3M Brand SECRETARY II copy machine, wherein excellent copies of an original document were produced, both from the coated as well as from the uncoated sides of the drum. However, the positive effect of the 2 micrometer thick Lexan®/TNF overcoating was demonstrated as follows. The surface potential on the drum after charging in a non-functional test apparatus was determined to be approximately 1150 volts on the top coated portion of the drum, while a surface potential of only approximately 1050 volts was developed on the uncoated portion. The drum was then utilized in the SECRETARY II machine and 1,000 copies made using the drum. To accelerate the rate of possible crystallization of the selenium tellurium layer, the drum was then heated at 65 degrees Centigrade for 6.5 hours. The surface potential was then again measured as in the same non-functional test apparatus and was found again to accept a charge of 1150 volts in the topcoated portion of the drum, whereas a potential of only 750 volts was attained on the non-topcoated portion. This reduction in surface potential on the non-topcoated portion was observed to be sufficient to cause a significant decrease in image density.

Figure 5:
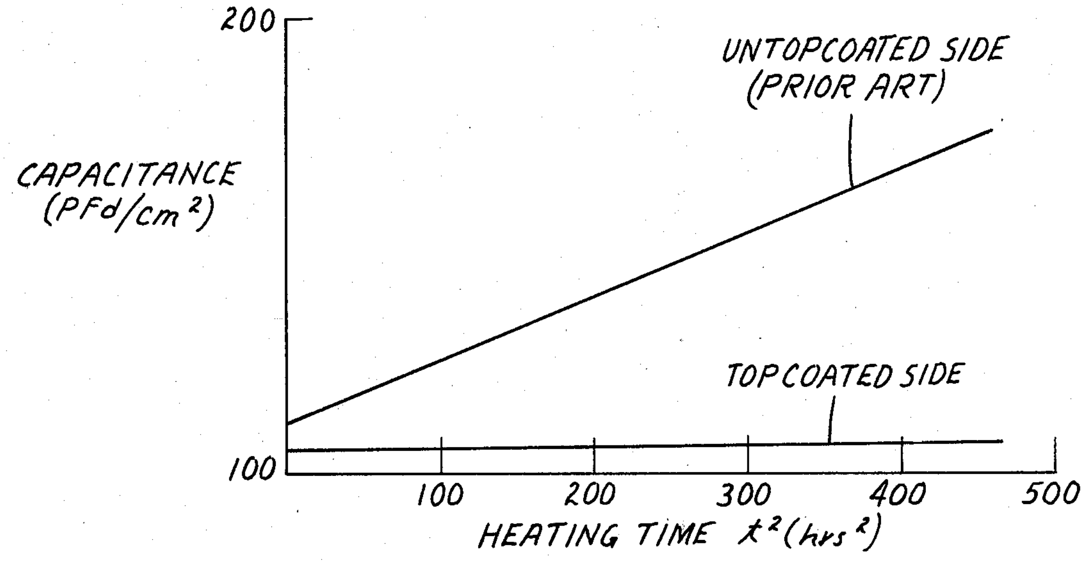
FIG. 5 is a graph showing the effect on certain electrical properties of the top coating layer pursuant to the present invention.

The effect of the topcoat on the crystallization of the Se-Te photoconductive-insulative layer in an electrophotographic drum as used in the 3M Brand SECRETARY II machine is shown in FIG. 5. In that Figure, capacitance is plotted as a function of the time of heating. It may be noted that the non-topcoated portion of the drum exhibited an increase in the capacitance as a function of heating time. Such an increase in capacitance is evidence of an increase in the dielectric constant of the photoconductive-insulative drum and is believed to be attributed to the increased crystallization in the layer. In contrast, essentially no change in the capacitance was observed for the topcoated portion of the drum, thus indicating that no change in the crystallization of the Se-Te layer resulted during the heating operation. It is believed that the topcoat thus seals the surface of the Se-Te layer and minimizes the occurrence of scratches and the like on the Se-Te layer such that nucleation sites and other defects which would promote crystallization during continued use are minimized.

EXAMPLE 2

To further show the effectiveness of the electron transport overlayer pursuant to the present invention, a second selenium-tellurium (95:5) coated aluminum drum was prepared as in Example 1. By appropriately masking the surface of the drum, one portion of the drum was spray coated with a solution containing 2 wt.% solids of Lexan® and TNF, together with equal portions of dichloromethane, and 1,2-dichloroethane, the ratio of Lexan® to TNF being approximately 70:30, so as to result in 30 wt.% of TNF in the final coating. The first portion of the drum was coated to provide a dry thickness of about 2 micrometers thick. The same solution was spray coated onto a second portion of the drum for an extended length of time to provide a dry coating thickness of about 5 micrometers, while a third section of the drum was left uncoated. Testing of the drum in a 3M Brand SECRETARY Type III copy machine indicated no significant differences in copy quality. Non-functional test data indicated only slight charge acceptance and residual potential differences among the three drum sections. Whereas the non-topcoated portion of the drum was found to accept a charge of approximately 975 volts, the 2 micrometer Lexan®/TNF coated portion accepted a charge of approximately 1035 volts and the 5 micrometer coated portion accepted a charge of approximately 1,030 volts. The residual voltage retained after approximately 50 cycles was found to be about 10 volts on the non-topcoated portion and 25 and 40 volts, respectively, on the two micrometer and 5 micrometer topcoated portion. Such residual charges on all three portions were found to be negligible and not to be associatable with any significant decreases or changes in the copy quality.

EXAMPLE 3

A Se-Te (95:5) coated aluminum drum was again prepared as in Example 1. Also, as in Example 1, in this example the drum was also dipcoated, but in 3 respective sections, employing TNF/Lexan ® polycarbonate solutions. Generally, it was observed that dipcoating provided a smoother and more defect-free coating than the spray coating technique utilized in Example 2. In this Example, one portion of the drum was dipped into a two percent Lexan ® polycarbonate solution containing 30 wt.% TNF in a 50:50 wt.% mixture of dichloromethane and 1,2-dichloroethane, while a second section of the drum was dipped into a similar 4% solution to provide a thicker Lexan ®/TNF coating. The center portion of the drum was left with no topcoat. Coating thicknesses on one portion were estimated to be 0.5–1 micrometer thick and to be 1–2 micrometers thick on the other coated portion. Non-functional test data again indicated but slight differences along the three drum sections, and the testing of the drum in a 3M Brand SECRETARY III machine indicated no appreciable differences in copy quality. The non-functional test data indicated that the charge acceptance on the three portions of the drum were in the range between 960 to 990 volts. The residual voltage retained after 50 cycles was 5 volts along the non-topcoated portion and increased to 40 volts on the 1–2 micrometer TNF/Lexan ® coated portion.

EXAMPLE 4

To further demonstrate the utility of the electron acceptance material in the topcoat layer, a selenium-tellurium (95:5) coated drum was first prepared as in Example 3 and opposite ends of the drum were then dipcoated in sections employing an undoped Lexan ® solution, i.e. with no TNF present, and in a TNF/Lexan ® solution, respectively. The first section of the drum was dipped in a 6% Lexan ® polycarbonate solution in a 50/50 wt.% mixture of dichloromethane and 1,2-dichloroethane. The opposite section of the drum was dipped into an identical solution in which 30 wt.% TNF was added. The center section of the drum was left uncoated. The coating thicknesses of both coated sections was estimated to be approximately 2 to 5 micrometers thick. The section of the drum with the Lexan ® topcoat was found to be characterized by a very high residual potential, and also showed excessive backgrounding when tested in a 3M Brand SECRETARY III machine. Specifically, the section having a Lexan ® only topcoat was found to accept a charge of approximately 1150 volts. However, after 50 cycles a residual potential of 990 volts was present. In contrast, the section of the drum with no topcoat was found to accept an initial charge of 1,085 volts and to have no residual charge, while the section containing a TNF/Lexan ® topcoat was found to accept 1130 volts of charge and to exhibit a residual potential after 50 cycles of only 30 volts.

EXAMPLE 5

The desirability of providing a selenium-tellurium photoconductive-insulative layer on the drums pursuant to the present invention is further demonstrated in experiments in which drum blanks were prepared with vapor-coated layers of 60 to 65 micrometers of undoped selenium. Two such drums were prepared in which one-half of each was then topcoated with approximately two micrometers thick layer of TNF/Lexan ® as provided in Example 2. Both drums were then charged to 1000 volts, exposed to 600 microwatts per square centimeter from a tungsten lamp and were then discharged by an electroluminescent strip having an intensity of approximately 13 microwatts per square centimeter. The residual voltage after such a discharge was found to range between 16 to 20 volts, which is an acceptable level. However with multiple cycling, i.e., 50 cycles, the residual voltage was found to increase to approximately 130 to 250 volts. The unacceptability of such a buildup was confirmed in corresponding tests on a 3M SECRETARY Type III machine, wherein the copies were found to have unacceptable backgrounding. The residual build-up was found to be approximately the same for both the topcoated and uncoated halves of each drum. However, since the topcoated side was found to charge to a higher level, the copies were also darker on that half.

EXAMPLE 6

To further demonstrate the undesirable results obtained from electrophotographic drums or plates pursuant to prior art teachings, an electrophotographic plate was prepared having a relatively thin photoconductive-insulative layer and a relatively thick electron transport layer. Pursuant to such an embodiment, a drum blank was vapor coated with approximately 1.3 micrometers of undoped selenium, which layer was then dipcoated in a TNF/Lexan ® solution having a 30 wt. percent TNF loading, which loading is close to the limit at which the TNF crystallizes out. A 5 micrometer topcoat on one half of the drum was found to accept only about 350 volts. The other half of the drum was topcoated to a thickness of approximately 35 micrometers thick, and this half was found to accept charges with a potential of approximately 1,000 volts. After exposure to a tungsten lamp and discharge via an electroluminescent strip as described in Example 5, the retained surface potential on the thicker topcoated side was still found to be approximately 900 volts. When run in a 3M Brand SECRETARY III, both sides of the drum were found to exhibit high background levels, which increased still further with multiple copies. The images were found to be faint or non-existent. Further, the TNF was found to have partially crystallized on the thicker side, giving a distinct mottled appearance to the copies.

The prior art teaching described above indicates that the TNF loading should be at least 25 weight percent, and one prior art example shows that at least a 75% loading was used. Example 6 thus shows that such a loading is not adequate for discharging thick topcoat layers used in the present invention. Rather, in the present invention, it has been found that levels higher than 30–35% cannot be used and still maintain a smooth, tough film and produce defect-free copies.

In the description and examples set forth above, an improved, novel and practical electrophotographic device has been disclosed in which the ratio of the thickness of the transport layer to that of the photoconductive-insulative layer in the device has been varied between 1.8 and 1:100. A wide variety of such materials and ranges and varying combinations of thicknesses have been found to give acceptable results. While the Examples set forth hereinabove have been found to be preferable both in terms of performance and availability such that the invention has been disclosed with respect to certain particular embodiments it is readily apparent that many modifications and variations are both conceivable and practicable. All such alternative modifications thus fall within the true spirit and scope of this invention.

Having thus described the present invention, what is claimed is:

1. An electrophotographic plate comprising a conductive substrate, a photoconductive-insulative layer overlaying the substrate and a transparent, electrically-active, organic, electron transport layer overlaying the photoconductive-insulative layer, characterized by the photoconductive-insulative layer comprising vitreous selenium and tellurium and alloys thereof, in which selenium is present in an amount within the range of 90 and 97.5 atomic percent, the photoconductive-insulative layer having a thickness within the range of 40–100 μm and the electron transport layer having a thickness within the range of 1–5 μm such that the ratio of the thickness of the electron transport layer to that of the photoconductive-insulative layer is between 1:8 and 1:100, and by said electron transport layer comprising not greater than 35 weight percent of an aromatic or heterocyclic organic electron acceptor material dispersed in an organic binder.

2. A plate according to claim 1, wherein said electron acceptor material is selected from the group consisting of 2,4,7,-trinitro-9-fluorenone, 2,4,5,7-tetranitrofluorenone, trinitroacridine, tetracyanopyrene, and dinitroanthraquinone.

3. A plate according to claim 2, wherein said binder comprises a thermoplastic polycarbonate condensation product of bisphenol-A and phosgene.

4. A plate according to claim 1, wherein said electron transport layer is approximately 3 to 4 micrometers thick.

5. A plate according to claim 1, wherein said photoconductive-insulator layer consists of approximately 95 atomic percent Se and 5 atomic percent tellurium.

6. A plate according to claim 1, wherein said photoconductive-insulator layer is approximately 65 micrometers thick.

7. A plate according to claim 1, further comprising an insulative barrier layer between the conductive substrate and the photoconductive-insulative layer.

8. A method of imaging comprising (a) providing an electrophotographic plate having a conductive substrate, a photoconductive-insulative layer overlying the substrate, and an electron transport layer overlying the photoconductive-insulative layer, the photoconductive-insulative layer comprising vitreous selenium and tellurium and alloys thereof, in which selenium is present in an amount within the range of 90 and 97.5 atomic percent and the electron transport layer comprising a coating of not greater than 35 weight percent of an aromatic or or heterocyclic organic electron acceptor dispersed in an organic binder, the photoconductive insulative layer having a thickness within the range of 40–100 μm and the electron transport layer having a thickness within the range of 1–5 μm such that the ratio of the thickness of the electron transport layer to that of the photoconductive-insulative layer is between 1:8 and 1:100, (b) uniformly charging the plate to a predetermined positive potential, and (c) exposing the plate to a source of radiation to which the transport layer is substantially transparent and to which the photoconductive-insulative layer is responsive to result in the photo-generation of electron-hole pairs such that said radiation passes through the transport layer and causes said electron-hole pairs to be generated, said electrons and holes then being transported to form a latent electrostatic charge image on the surface of the plate.

9. A method according to claim 8, wherein said providing step includes evaporating onto the substrate a composition consisting of selenium and tellurium wherein selenium is present in an amount within the range of 90 and 97.5 atomic percent.

10. A method according to claim 9, wherein said evaporating is selected to provide a layer consisting of 95 atomic percent selenium and 5 atomic percent tellurium.

11. A method according to claim 8, further comprising developing the latent image to make it visible.

12. A method according to claim 8, comprising applying a coating onto the photoconductive-insulative layer of a solution of 2,4,7-trinitro-9-fluorenone and a binder comprising a thermoplastic polycarbonate condensation product of bisphenol-A and phosgene in a solvent including dichloromethane and dichloroethane.

13. A system for forming electrographic images comprising (a) an electrophotographic plate including a conductive substrate, a photoconductive-insulative layer overlaying the substrate, and a transparent, electronically-active, organic, electron transport layer overlaying the photoconductive-insulative layer characterized by the photoconductive-insulative layer comprising vitreous selenium and tellurium and alloys thereof, in which selenium is present in an amount within the range of 90 and 97.5 atomic percent, the photoconductive-insulative layer having a thickness within the range of 40–100 μm and the electron transport layer having a thickness within the range of 1–5 μm such that the ratio of the thickness of the electron transport layer to that of the photoconductive-insulative layer is between 1:8 and 1:100, (b) means for uniformly charging the plate to a predetermined positive potential, and (c) means for exposing the plate to a source of radiation to which the transport layer is substantially transparent and to which the photoconductive-insulative layer is responsive to result in the photogeneration of electron-hole pairs such that said radiation passes through the transport layer and causes said electron-hole pairs to be generated, said electrons and holes being transported to form a latent electrostatic charge image on the surface of the plate.

14. A system according to claim 13, further comprising means for developing the latent image to make it visible.

* * * * *